(12) United States Patent
Liu et al.

(10) Patent No.: US 6,549,504 B2
(45) Date of Patent: Apr. 15, 2003

(54) DUAL OPTICAL PICKUP HEAD FOR ACCESSING BOTH DVD AND CD DISC

(75) Inventors: Chin-Sung Liu, Maio-Li (TW); Shin-Ter Tsai, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 10/083,139

(22) Filed: Feb. 27, 2002

(65) Prior Publication Data

US 2002/0080708 A1 Jun. 27, 2002

Related U.S. Application Data

(63) Continuation of application No. 09/325,380, filed on Jun. 4, 1999.

(51) Int. Cl.[7] .................................................. G11B 7/00
(52) U.S. Cl. ............................. 369/112.24; 369/44.14; 369/53.25
(58) Field of Search ........................ 369/44.14, 44.22, 369/44.23, 44.37, 121, 112.21, 112.24, 44.19, 53.25

(56) References Cited

U.S. PATENT DOCUMENTS

| | | | |
|---|---|---|---|
| 5,673,247 A | 9/1997 | Sekimoto et al. | 369/44.14 |
| 5,777,959 A | 7/1998 | Nakagawa et al. | |
| 5,784,354 A | 7/1998 | Lee | |
| 5,923,636 A | 7/1999 | Haruguchi et al. | |
| 5,956,312 A | 9/1999 | Ishihara | 369/121 |
| 6,034,939 A | 3/2000 | Takasawa et al. | |
| 6,111,827 A | 8/2000 | Miike | 369/44.14 |
| 6,240,053 B1 | 5/2001 | Akiyama | 369/44.23 |

Primary Examiner—William Korzuch
Assistant Examiner—Kim-Kwok Chu
(74) Attorney, Agent, or Firm—Bacon & Thomas, PLLC

(57) ABSTRACT

A dual optical pick-up head for accessing CD, CD-R and DVD discs is provided. The provided dual optical pick-up head uses an objective lens and a laser source for DVD discs, and uses another objective lens and another laser source for CD and CD-R discs. Spirit of the invention is that both objective lenses are located in the same lenses holder which connect to a guide rod, and the lenses hold moves only along a radius of the corresponding disc. Moreover, the laser beam produced by any laser source is transmitted through corresponding objective lens to a disc, and the reflected laser beam is transmitted through corresponding objective lens to a PDIC and then a spot is formed and detected. Hence, the location of each objective lens must satiate the requirement that any spot that corresponds to a specific track of disc does not mix with other spots that correspond to other track of disc.

19 Claims, 6 Drawing Sheets

DUAL OPTICAL PICKUP HEAD FOR ACCESSING BOTH DVD AND CD DISC

This application is a continuation of the original application numbered as Ser. No. 09/325,380, which filed Jun. 4, 1999.

BACKGROUND OF THE INVENTION

1. Field of the Invention

The present invention relates to a dual optical pick-up head that is capable of accessing both CD (compact disc) disc and DVD (digital versatile disc) discs. More particularly, the present invention relates to a dual optical pick-up head that not only employs two objective lenses and one actuator but also rids the requirement to switch position of objective lenses while different discs are detected.

2. Description of the Prior Art

The DVD is an optical disc that is capable of recording a large amount of digital information. Its recording scheme allows the recording of digital information, such as video, computer information or the like on a disc having the same diameter as the CD, at a recording density of six to eight times as high as the CD. No matter how, although the storage amount of DVD disc is larger than CD disc, CD disc is more widespread used in many fields than DVD disc. Thus, it is common commercial benefit that a DVD player uses a dual optical pick-up head not only work with DVD discs but also compatibly work with traditional CD discs.

Evidently, when picking up data from a DVD disc the dual optical pick-up head works with a shorter focal length of objective lens and a shorter wavelength laser beam. Moreover, when picking up data from a CD disc the dual optical pick-up head works with a larger focal lengths and a larger wavelength laser beam. Therefore, the dual optical pick-up head should be capable to work with different wavelength lasers and different focal-length objective lenses.

In order to solve such a problem, one conventional method uses two objective lenses for both DVD and CD separated where two lenses are switched in accordance with the type of disc. Another conventional method uses a correcting lens that is inserted into a collimator portion, thereby correcting the aberration due to the disc. The other conventional method uses a two-focal objective lens such as holographic optical element (HOE) as an objective lens. A further conventional method uses a liquid crystal (LCD) shutter to modulate laser beam. Among these conventional methods, two methods are more popular than others and are explained in posterior paragraphs.

FIG. 1A and FIG. 1B show the mechanism of the dual optical pick-up head with the usage of the two-focal point objective lens. When CD disc 10 is accessed and 780 nm wavelength laser beam 11 is incident, as shown in FIG. 1A, laser beam 11 transmits through two-focal point objective lens 12 and is focused on CD disc 10. Similarly, when DVD disc 13 is accessed and 650 nm wavelength laser beam 14 is incident, as shown in FIG. 1B, laser beam 14 transmits through two-focal point objective lens 12 and is focused on DVD disc 13. Obviously, the optical performance of the two-focal point objective lens 12 is complicated, and then the structure is complex and the cost is expensive.

FIG. 2A and FIG. 2B show the mechanism of the dual optical pick-up head with the usage two objective lenses. When CD disc 23 is accessed and 780 nm wavelength laser beam 24 is incident, as shown in FIG. 2A, switching machine 22 puts CD objective lens 20 into path of 780 nm wavelength laser beam 24 and then 780 nm laser wavelength beam 24 is focused on CD disc 23. Similarly, when DVD disc 26 is accessed and 650 nm wavelength laser beam 25 is incident, as shown in FIG. 2B, switching machine 22 put DVD objective lens 21 into path of 650 nm wavelength laser beam 25 and then 650 nm laser beam 25 is focused on DVD disc 26. Evidently, the path of 780 nm wavelength laser beam 24 is equal to the path of 650 nm wavelength laser beam 25. Therefore, the positions of both CD objective lenses 20 and DVD objective lens 21 are switched to put required objective lens into the path of laser beam 24/25 while different discs 23/26 is detected. Clearly, the case requires complicated switching machine 22 that occupies a large space is necessary to switch objective lens, and then it is not suitable for a compact dual optical pick-up head.

Besides, in the method of using a LCD shutter, the polarization of the laser beam and location of LCD must be properly arranged, then the design is difficult to actualize. Furthermore, the LCD needs additional driving circuit to maintain shutter effect.

According to previous discussion, although several conventional ways are presented to compass the subject, none of them efficient and compact enough. Therefore, it is necessary to develop an economical dual optical pick-up head for accessing both CD and DVD discs.

SUMMARY OF THE INVENTION

One main object of the invention is to propose a dual optical pick-up head that can detect DVD discs and CD discs with one actuator and two objective lenses, especially to propose a dual optical pick-up head without the necessarily of a switching machine to switch these objective lenses while different discs are detected.

In comparison with conventional dual optical pick-up head with two objective lenses, a significant character of the proposed dual optical pick-up head is that these objective lenses do not have to switch their position while different discs are detected.

Therefore, the position that laser beam project into disc does not have to be located in a radius of disc that is parallel to the guide rod. Hence, the location of these two objective lenses is elastic and the configuration of the proposed dual optical pick-up head is convertible. Besides, because there is no requirement to use two-focal objective lens then the structure and fabrication of the proposed dual optical pick-up head is simplified and compact.

BRIEF DESCRIPTION OF THE DRAWINGS

Other objects, features, and advantages of the invention will become apparent from the following detailed description of preferred embodiments, with reference to the accompanying drawing in which.

DESCRIPTION OF THE PREFERRED EMBODIMENT

Figure 1A:
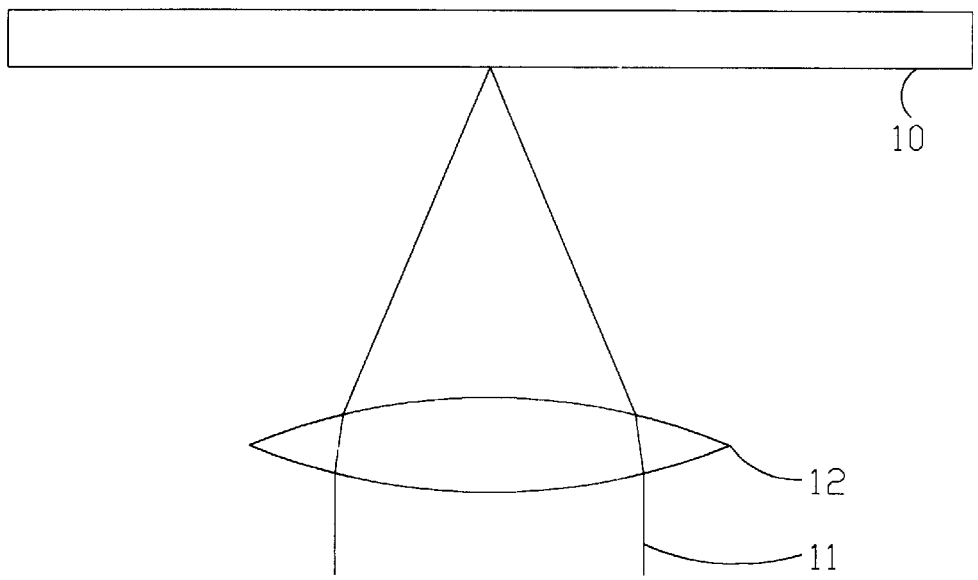
FIG. 1A and FIG. 1B illustrate an example of accessing both CD and DVD discs according to a conventional technique.
Figure 1B:
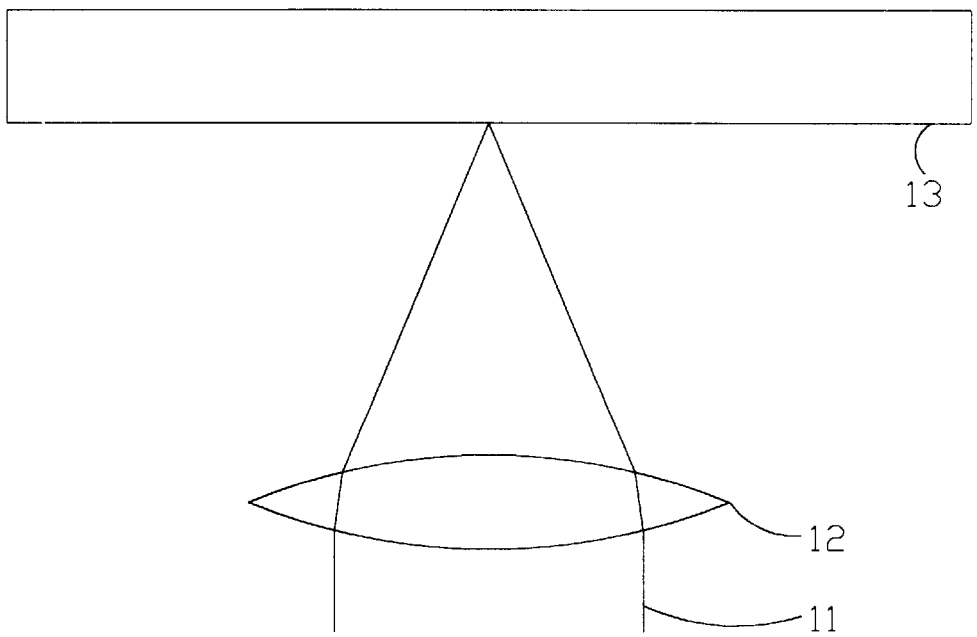
Figure 2A:
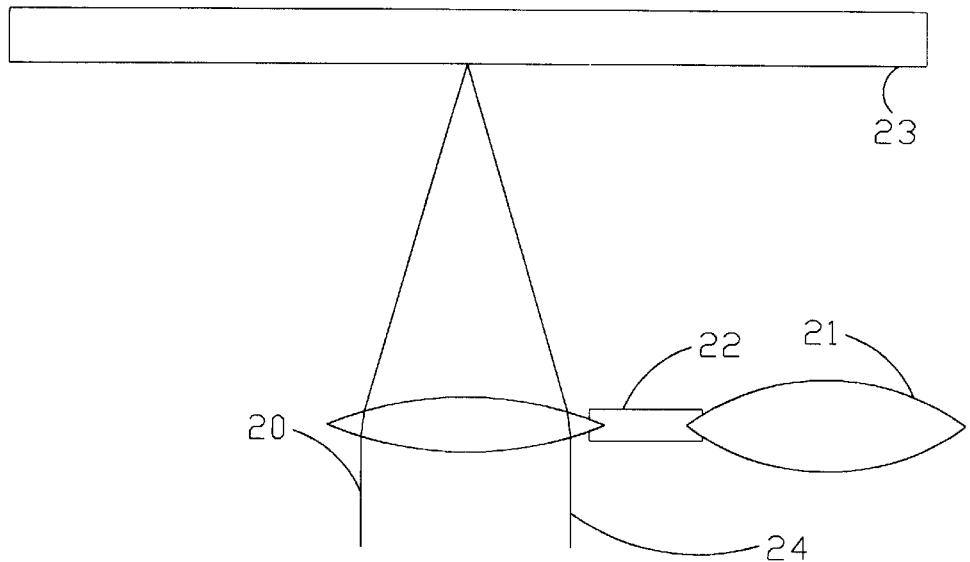
FIG. 2A and FIG. 2B illustrate another example of accessing both DVD and CD discs according to another conventional technique.
Figure 2B:
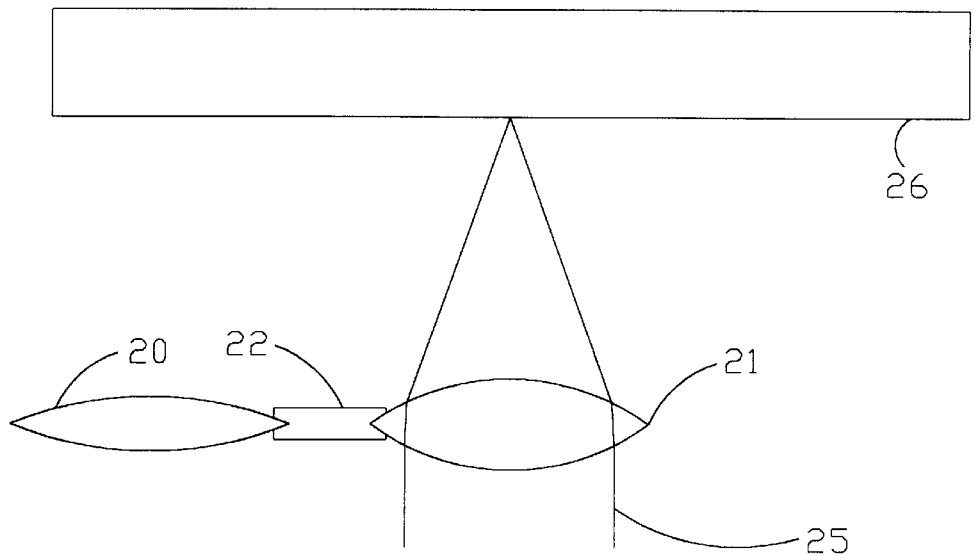

FIG. 3A to FIG. 3D schematically illustrate a preferred embodiment of the invention. Obviously, the proposed dual optical pick-up head at least has first objective lens 31, second objective lens 32, objective lenses holder 33, guide rod 34, first light assembly 35 and second light assembly 36.

Figure 3A:
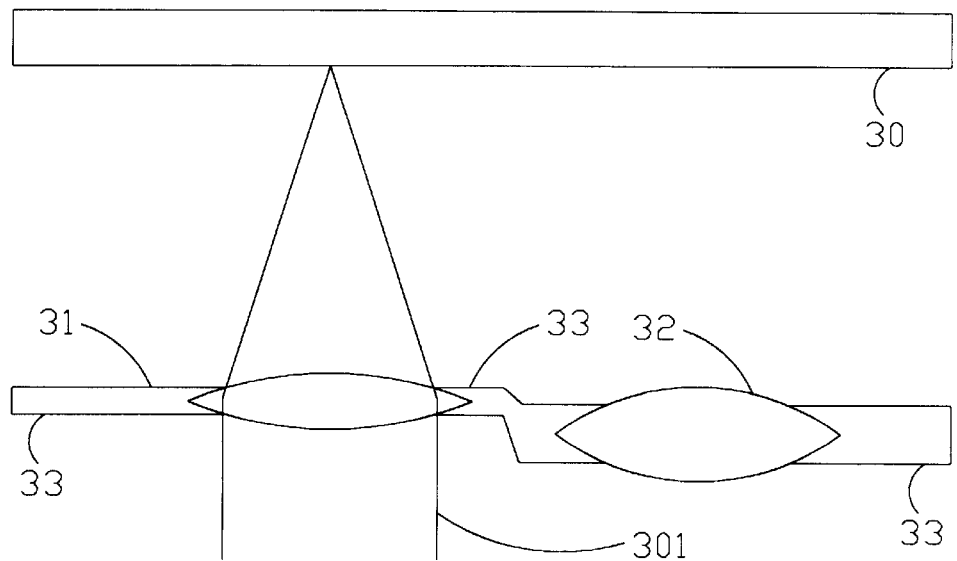
FIG. 3A to FIG. 3D illustrate a preferred embodiment of the invention.
Figure 3B:
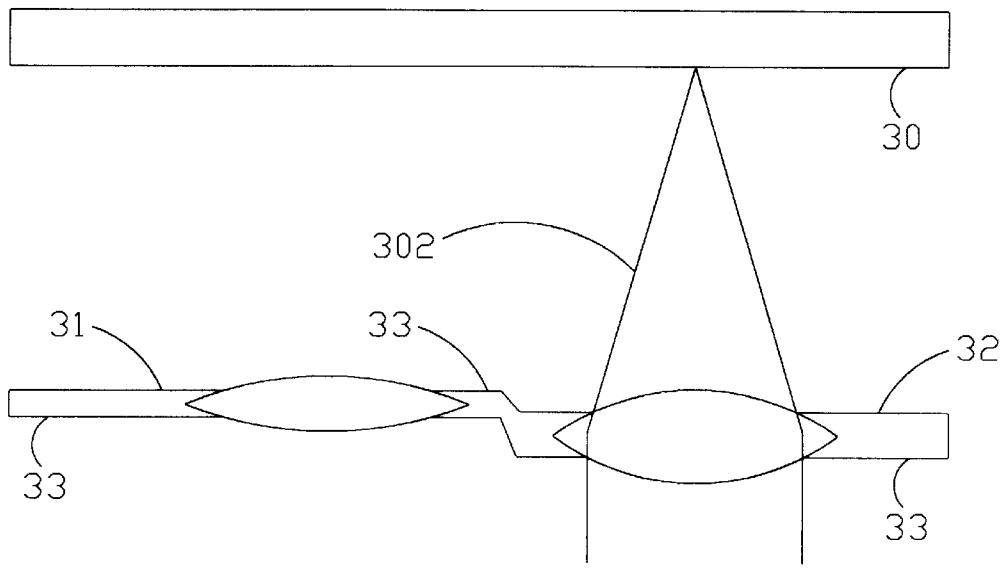

The basic mechanism of the embodiment could be explained by referring to FIG. 3A and FIG. 3B, where first objective lens 31 and second objective lens 32 are located separated and are located with lenses holder 33 Herein, it should be noted that the shape, the distribution, and the connection of both these lenses 31/32 and lenses holder 33 in FIG. 3A to FIG. 3B only is an example of this invention, this invention is not limited by the details of these figures.

When disc 30 is a DVD disc, first light beam 301 is incident, as shown in FIG. 3A, and is transmits through first objective lens 31 and focused on disc 30 (DVD disc). Similarly, when disc 30 is a CD disc, second light beam 302 is incident, as shown in FIG. 3B, and is transmits through second objective lens 32 and focused on disc 30 (CD disc). Indisputably, the invention uses two separate objective lenses 31/32 to detect different kind disc (DVD/CD) separately, thus, the structure and cost of each objective lenses 31/32 are simply and cheap, and it is not necessary to switch the location of the objective lenses 31/32 while different kind discs 30 are detected. Further, owing to objective lenses 31/32 must be moved to detect different tracks of the detected disc 30, the invention only requires that the distances between each objective lens 31/32 and disc 30 is fixed and requires that objective lenses 31/32 essentially do not move along the tangent direction of disc 30.

Both first objective lens 31 and second objective lens 32 are located in objective lenses holder 33 without any machine to switch position of both objective lenses 31/32. Thus, both objective lens 31/32 are moved with objective lenses holder 33, neither first objective lens 31 not second objective lens 32 would be moved inside objective lenses holder 33. In other words, both objective lenses 31/32 are fixed in objective lenses holder 33. Further, guide rod 34 is used to move objective lenses holder 33, first light assembly 35 and second light assembly 36. However, it should be emphasized that guide rod 34 is essentially parallel to the detected disc 30, thus, the distance between both objective lens 31.32 and disc 30 essential is fixed, and also is independent on the movement of guide rod 34. Further, the number of guide rod 34 is not limited, the shape and the construction of guide rod 34 also are not limited.

Moreover, numerical aperture of first objective lens usually is about 0.60 and numerical aperture of said second objective lens usually is about 0.4 to 0.5. Besides, first light assembly 35 comprises first laser source 351, first beam splitter 352, first collimator 353 and first photo detector integrated circuit (PDIC) 354. Second light assembly 36 comprises second laser source 361, second beam splitter 362, second collimator 363 and second photo-detector integrated circuit 364.

It should be noted that first objective lens 31 and first light assembly 35 are used to access DVD disc; second objective lens 32 and second light assembly 36 are used to access CD disc. Moreover, in the embodiment, The position that first laser beam project on disc 30 does not locate in a radius that is parallel to guide rod 34, but the position that second laser beam project on disc 30 does locate in a radius that is parallel to guide rod 34. However, the invention never limits the project location of both laser beams.

When disc 30 is a DVD disc, first laser source 351 produces first laser beam which transmits through first beam splitter 352, first collimator 353, first objective lens 31 in sequence and then is focused on disc 30. Therewith first laser beam is reflected by disc 30 and reflected first laser beam transmits through first objective lens 31, first collimator 353, first beam splitter 352 in sequence and then is detected by first photo detector integrated circuit 354.

In comparison, if disc 30 is a CD disc, second laser source 361 produces second laser beam which transmits through second beam splitter 362, second collimator 363, second objective lens 32 in sequence and is focused on disc 30. Next, second laser beam is reflected by disc 30 and reflected second laser beam transmits through second objective lens 32, second collimator 363 and second beam splitter 362 in sequence, and then is detected by second photo-detector integrated circuit 364.

Figure 3C:
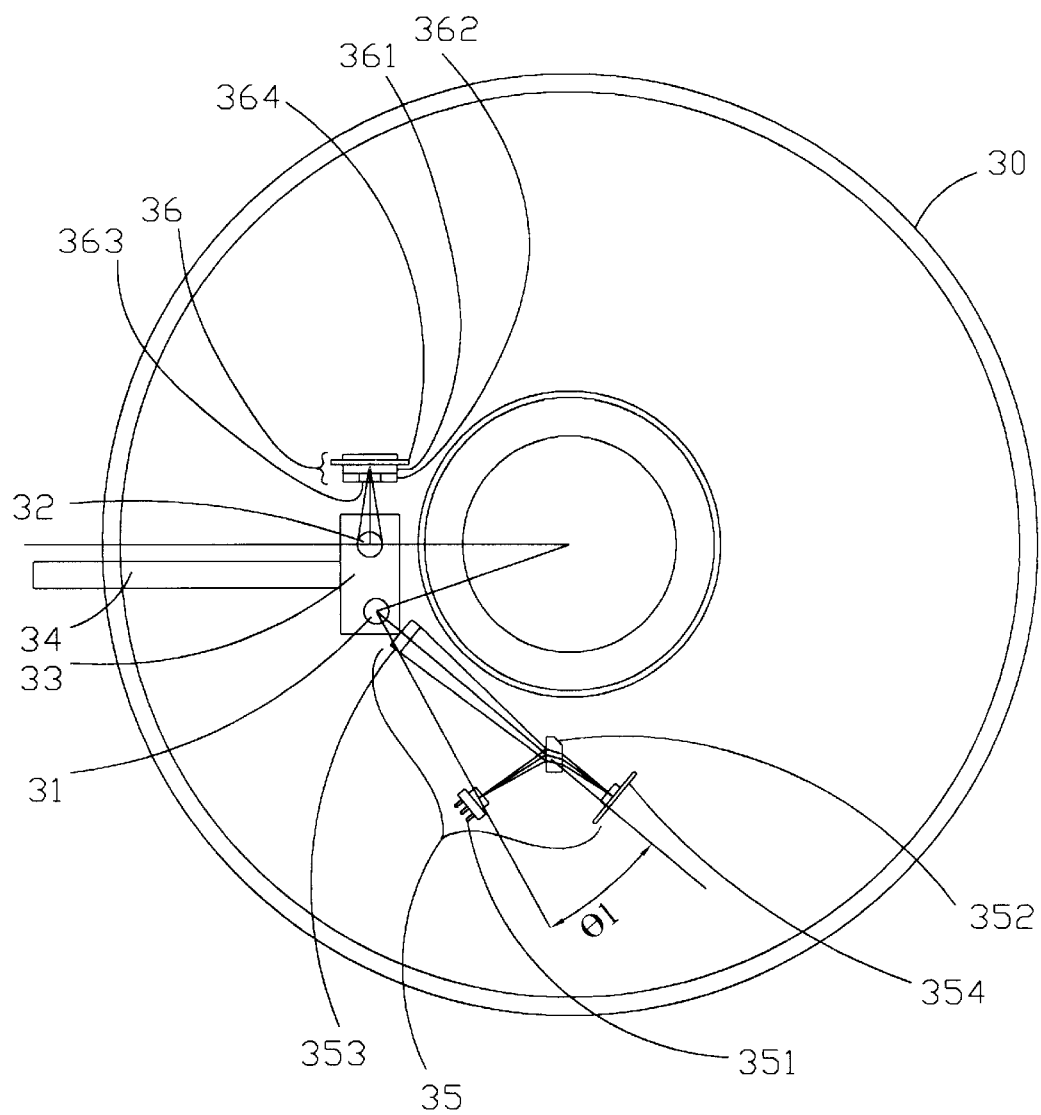
Figure 3D:
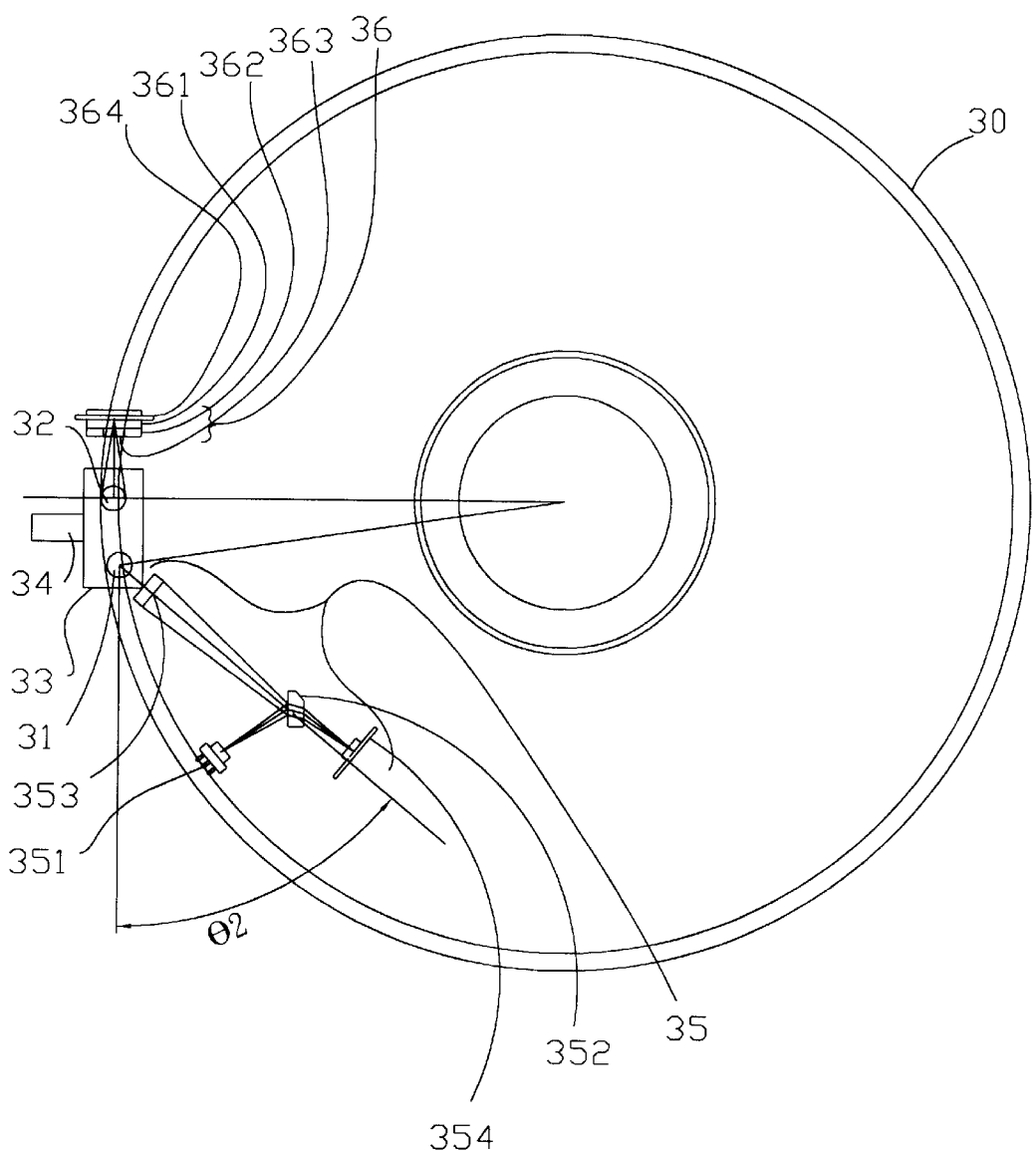

When different tracks of disc 30 are accessed, first objective lens 31, first light assembly 35, second objective lens 32 and second light assembly 36 all are moved by guide rod 34, where the moving direction is parallel to a radius of disc 30. FIG. 3C illustrates a specific case that the innermost track of disc is accessed and FIG. 3D illustrates another specific case that the outermost track of disc is accessed.

According to FIG. 3A through FIG. 3D, it is apparent that second laser beam is always incident to second objective lens 32 by a direction which is vertical to moving direction of objective lenses holder 33. In comparison, first laser beam is incident to first objective lens 31 by a direction that always is not parallel to tangent direction of disc 30. Wherein, the degree of the angle that between the direction that first laser beam is incident to first objective lens 31, and the tangent direction of a point of disc 30 that first laser beam is projected on it is varied. Furthermore, the degree of the angle is gradually increased from the innermost track of disc 30 to outermost track of disc 30. When first objective lens 31 locates in a first position that corresponds to the innermost track of disc 30, the degree of the angle is θ 1; when first objective lens 31 locates in a second position that corresponds to the outermost track of disc 30, the degree of the angle is θ 2. Obviously, the values of both θ 1 and θ 2 depend on the configuration of the dual optical pick-up head, and should be carefully controlled to ensure the correct access of disc 30..

Because the reflected first laser beam does not be parallel to tangent direction of disc 30 in first objective lens 31, the projection that reflected first laser beam projects in first PDIC 352 is moveable. When different tracks of disc 30 are accessed, as shown in FIG. 4B to FIB. 4C, not only first objective lens 31 is moved in a interval that between the first position and the second position, but also the angle that between the incident direction of first laser beam and tangent direction of disc 30 is varied in another interval that betweenθ 1 and θ 2. Moreover, the variation of the angle is proportional to the moving distance of first objective lens 31, and the proportional relation comprises linear direct proportional relation. Of course, projection 40 that first laser beam projects on first PDIC 354 also is moved in a homologous range, and homologous range also is proportional to the moving distance of first objective lens 31. Thus, it is important that projection 40 of reflected first laser beam from any track should not be mix with projections 40 of reflected first laser beam which from other tracks, otherwise it is impossible to correctly access disc 30. In other words, the value of θ 1 and value ofθ 2 must satisfy the requirement that projection 40 of reflected first laser beam from any track should not be mix with projections 40 of reflected first laser beam which from other track.

Figure 4A:
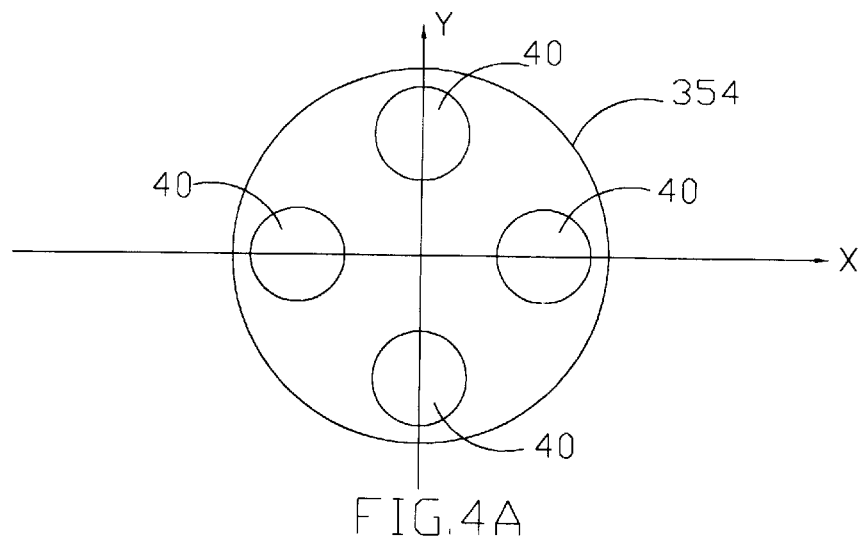
FIG. 4A to FIG. 4C illustrate how projection that laser beam projects on photo-detector integrated circuit is varied.
Figure 4B:
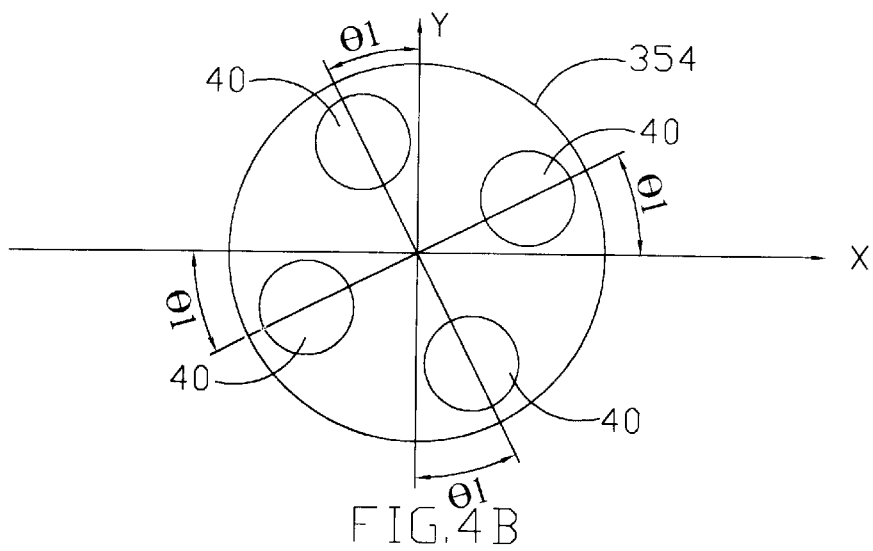
Figure 4C:
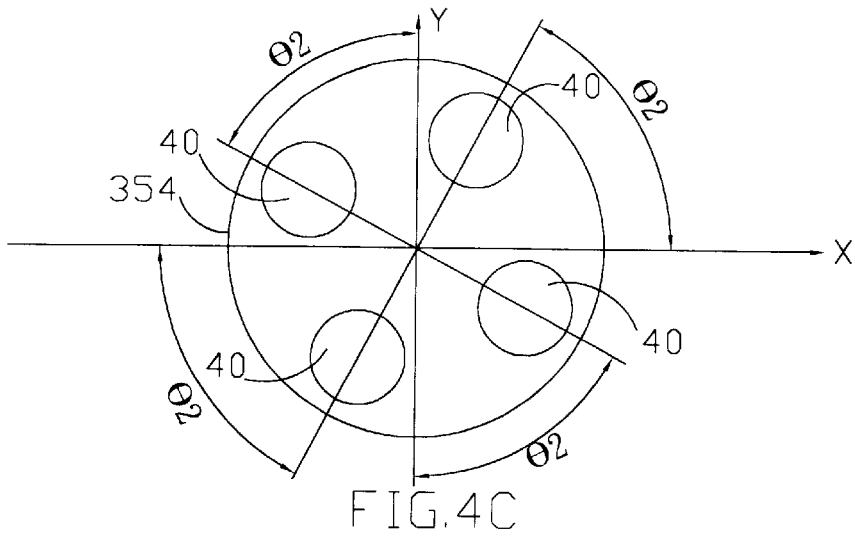

FIG. 4A to FIG. 4C illustrate how projection 40 that first laser beam projects in first photo detector integrated circuit 354 is varied. Moreover, in the provided embodiment the type of first PDIC 354 is choused to such that there are four projections 40 correspond to one reflected first laser beam in first PDIC 354 at same time.

First, if location of first objective lens 31 is corresponding to a radius of disc 30 which is parallel to moving direction of objective lenses holder 33, as second objective lens 32 of the provided embodiment, then projection 40 are formed in both x-axis and y-axis of first PDIC 354, as shown in FIG. 4A.

No matter how, in the provided embodiment first object lens 31 does not correspond to such a radius of disc 30, and the angle that between the incident direction of first laser beam and the tangent direction is varied in a range from θ 1 to θ 2. Thus, projection 40 of first laser beam does not locate in both axes of first PDIC 354. When the innermost track of disc is accessed, degree of the angle that between the incident direction of first laser beam and the tangent direction is θ 1, and projection 40 on first PDIC 354 is counterclockwise moved with same angle θ 1, as shown in FIG. 4B. Thereafter, when the outermost track is accessed, degree of the angle that between the incident direction of first laser beam and the tangent direction is θ 2, and projection 40 of first laser beam is counterclockwise moved with same angle θ 2, as shown in FIG. 4C.

Consequently, it is important that θ 2 is enough small such that projection 40 of first laser beam never overrun either x-axis or y-axis of first PDIC 354 to insure that projection 40 of first laser beam which from any specific track of disc 30 is not confused with the projection of first laser beam that from other track of disc 30.

Hence, the configuration of first laser source 351, first beam splitter 352, first collimator 353, first photo-detector integrated circuit 354 and first objective lens 31 is restricted by the requirement that projection 40 of first laser beam which from a specific track should not be mixed with projections 40 of first laser beam which from any other tracks.

While in the previous embodiment the location of CD objective lens (second objective lens 32) is corresponding to a radius of disc 30 that always is parallel to guide rod 34 and the location of DVD objective lens (first objective lens 31) is located in another radius of disc 30 that always is not parallel to guide rod 30. It is obviously that the mechanism of the invention is not restricted by the provided embodiment. By contrast, both CD objective lens (second objective lens 32) and DVD objective lens (first objective lens 31) can be locate in any position. Therefore, the only restriction of the structure of proposed dual optical pick-up head is that both projection 40 of first laser beam form a specific track of disc 30 can not be mixed with other projection 40 of first laser beam that form other track of disc 30. And projection that second laser beam projects on second PDIC 364 form a specific track of disc 30 also can not be mixed with other projection of second laser beam that form other track of disc 30.

According to previous discussion, the location of first objective lens 31, second objective lens 32, first light assembly 35 and second light assembly 36 are elastic, and then the configuration of the proposed dual optical pick-up head is convertible. Moreover, because there is no requirement to use two-focal objective lens, the structure and fabrication of the proposed dual optical pick-up head is simple and compact.

While the invention has been described by way of example and in terms of preferred embodiment, the invention is not limited there to. To the contrary, it is intended to cover various modifications, procedures and products, and the scope of the appended claims therefore should be accorded to the broadest interpretation so as to encompass all such modifications and similar arrangement, procedures and products.

What is claimed is:

1. A dual optical pickup for accessing both DVD and CD disc, comprising:
    an actuator, said actuator comprising a first objective lens, a second objective lens, an objective lenses holder, and a guide rod, wherein both said first objective lens and said second objective lens are located inside said objective lenses holder so as to be immovable in a direction perpendicular to an accessed disc and thereby maintain a fixed distance between said first objective lens and said accessed disc, and also a fixed distance between said second objective lens and said accessed disc;
    a first light assembly, said first light assembly being corresponding to a DVD disc;
    a second light assembly, said second light assembly being corresponding to a CD disc, said second light assembly being separated from said first light assembly.

2. The dual optical pickup head of claim 1, wherein both said first objective lens and said second objective lens are fixed in said objective lens holder.

3. The dual optical pickup head of claim 1, both said first light assembly and said second light assembly being moved by said guide rod.

4. The dual optical pickup head of claim 1, wherein said first light assembly comprises a first laser source, a first beam splitter, a first collimator and a first photo-detector integrated circuit.

5. The dual optical pickup head of claim 4, wherein said first laser source produces a first laser beam which transmits through said first beam splitter, said first collimator, said first objective lens in sequence and is focused in said DVD disc, then said first laser beam being reflected by said DVD disc and reflected said first laser beam being transmitted through said first objective lens, said first collimator, said first beam splitter in sequence and then being detected by said first photo-detector integrated circuit.

6. The dual optical pickup head of claim 5, the wavelength of said first laser beam being about 650 nm.

7. The dual optical pickup head of claim 5, wherein said first laser beam is focused on said DVD disc and does not located in a radius that is parallel to said guide rod.

8. The dual optical pickup head of claim 5, wherein a projection of said first laser beam which from a specific track of said DVD disc should not be mixed with another projections of said first laser beam which from any other track of said DVD disc.

9. The dual optical pickup head of claim 1, the numerical aperture of said first objective lens being about 0.60.

10. The dual optical pickup head of claim 1, wherein said first objective lens is moved between a first position and a second position, said first position corresponding to the innermost track of said DVD disc and said second position corresponding to the outermost track of said DVD disc.

11. The dual optical pickup head of claim 1, wherein the spatial relation between said objective lenses holder and said first light assembly is varied while said objective lenses holder being moved by said guide rod.

12. The dual optical pickup head of claim 1, wherein said second light assembly comprises a second laser source, a second beam splitter, a second collimator and a second photo-detector integrated circuit.

13. The dual optical pickup head of claim 12, wherein said second laser source produces a second laser beam which transmits through said second beam splitter, said second collimator, said second objective lens in sequence and is focused in said CD disc, then said second laser beam being reflected by said CD disc and reflected said second laser beam being transmitted through said second objective lens, said second collimator, said second beam splitter in sequence and then being detected by said second photodetector integrated circuit.

14. The dual optical pickup head of claim 13, the wavelength of said second laser beam being about 780 nm.

15. The dual optical pickup head of claim 13, wherein said second laser beam is focused on said CD disc and does not located in a radius that is parallel to said guide rod.

16. The dual optical pickup head of claim 13, wherein said second objective lens moves between a second position and a second position, said second position corresponding to the innermost track of said CD disc and said second position corresponding to the outermost track of said CD disc.

17. The dual optical pickup head of claim 1, the numerical aperture of said second objective lens being about 0.4 to 0.5.

18. The dual optical pickup head of claim 1, wherein the spatial relation between said objective lenses holder and said second light assembly is varied while said objective lenses holder being moved by said guide rod.

19. The dual optical pickup head of claim 18, wherein a projection of said second laser beam which from a specific track of said CD disc should not be mixed with another projections of said second laser beam which from any other track of said CD disc.

* * * * *